G. W. PRICE.
OSCILLATING SELF LAYING TRACK FOR TRACTION ENGINES.
APPLICATION FILED DEC. 29, 1914.

1,153,570.

Patented Sept. 14, 1915.
3 SHEETS—SHEET 1.

WITNESSES:

INVENTOR
Gomer W. Price
BY
Wm F. Booth
ATTORNEY

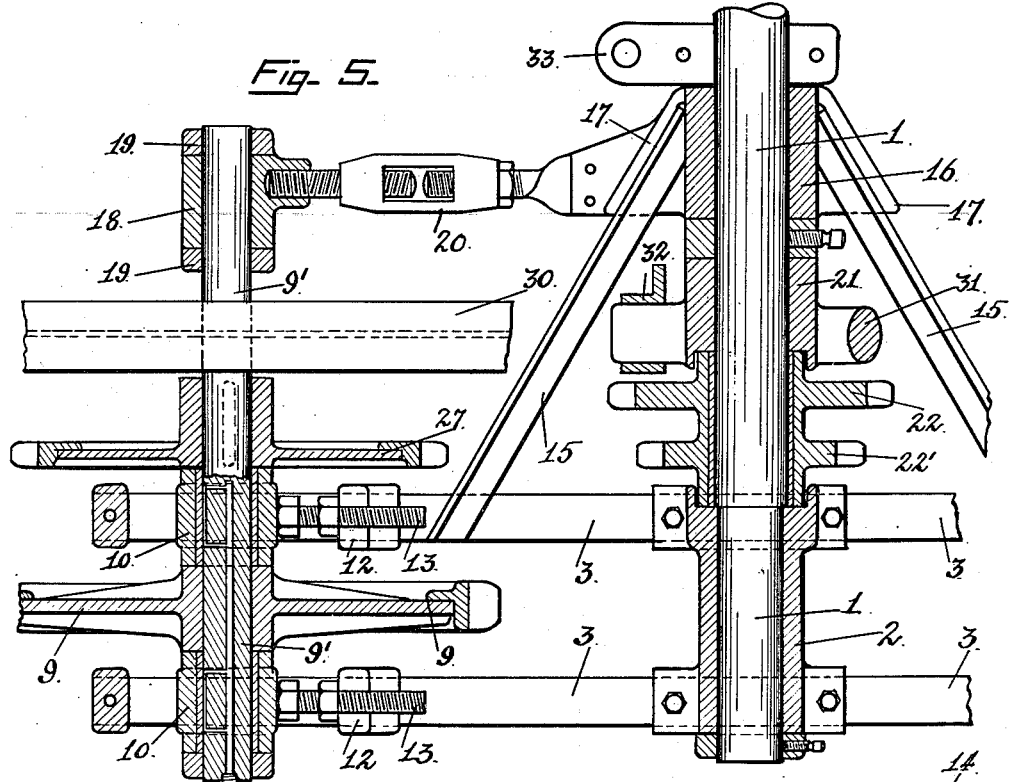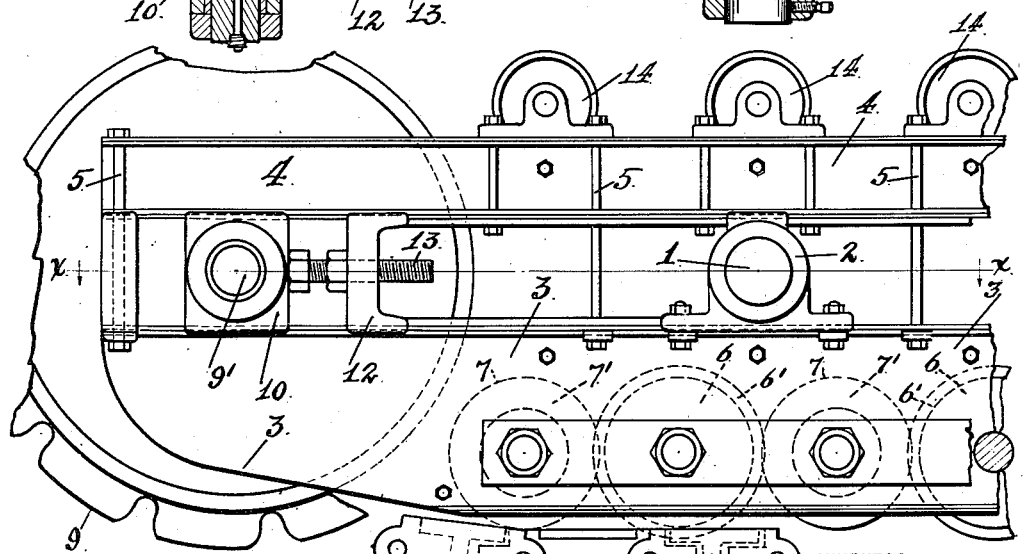

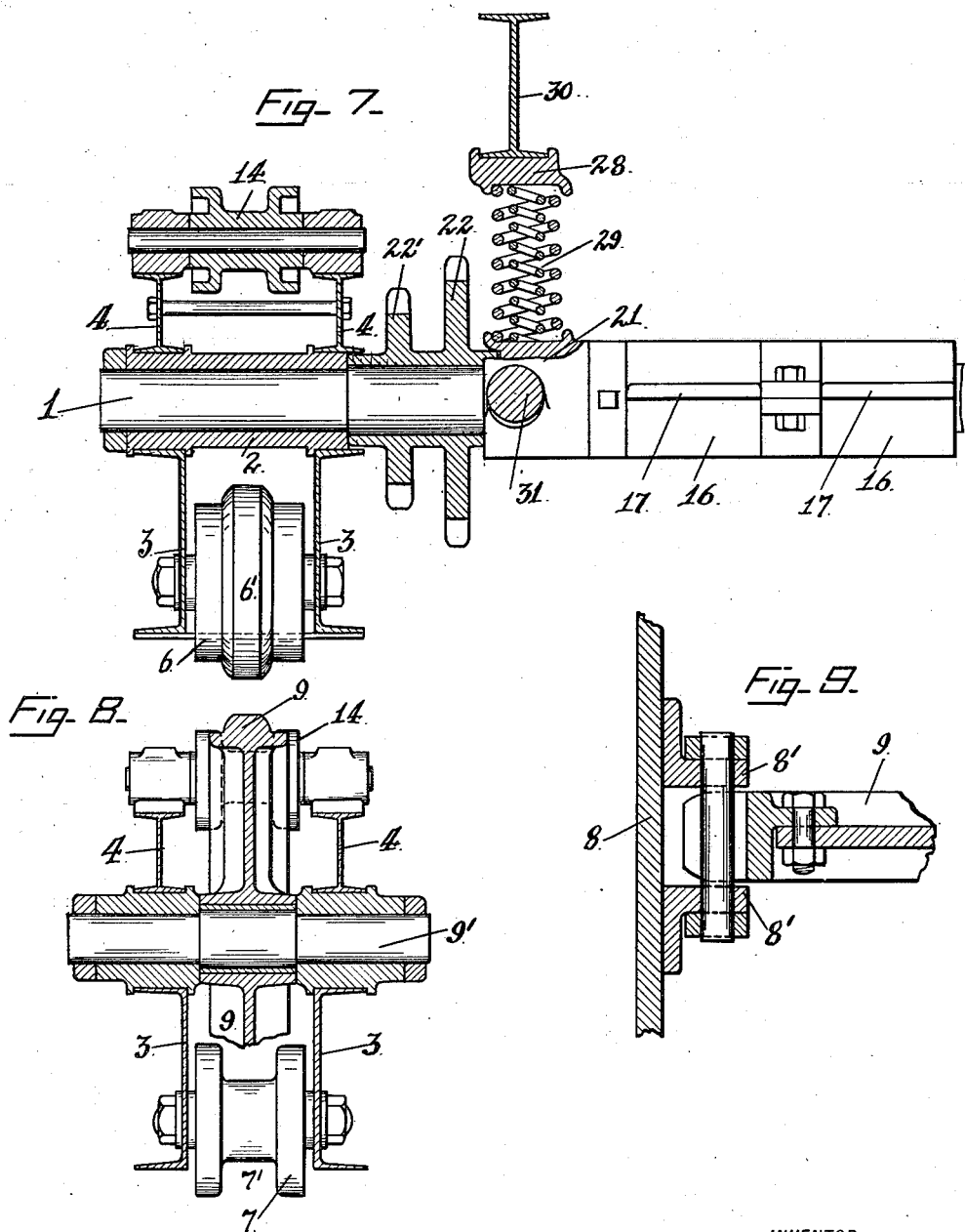

UNITED STATES PATENT OFFICE.

GOMER W. PRICE, OF OAKLAND, CALIFORNIA, ASSIGNOR TO HENRY L. SMITH, OF SAN RAFAEL, CALIFORNIA.

OSCILLATING SELF-LAYING TRACK FOR TRACTION-ENGINES.

1,153,570.   Specification of Letters Patent.   Patented Sept. 14, 1915.

Application filed December 29, 1914. Serial No. 879,569.

*To all whom it may concern:*

Be it known that I, GOMER W. PRICE, a citizen of the United States, residing at Oakland, in the county of Alameda and State of California, have invented certain new and useful Improvements in Oscillating Self-Laying Tracks for Traction-Engines, of which the following is a specification.

My invention relates, in general, to vehicles intended for travel over soft or uneven ground, particularly traction engines, and it especially relates to that type of tractors having self-laying tracks, comprising an endless chain of articulated broad-surfaced treads which serve as the traction drivers as well as the main supports for the vehicle.

My invention consists in a novel self-laying track construction in which independent tread frames, one on each side of the machine, are pivotally carried at about the middle of their length, by the main axle, and the tread-chains of said frames are driven by power transmitted from the power plant of the machine to devices in the axis of oscillation of said frames and thence to the drivers of said chains, whereby the tracks may independently oscillate to conform to any undulation or unevenness of the ground without affecting the driving connections.

The objects of my invention are to provide a self-laying track type of tractor in which the track will at all times lie parallel with the surface of the ground regardless of irregularities; also to provide a stationary or non-rotating axle around which said track oscillates, the two parts being thoroughly braced also to provide means for taking up and adjusting the tension of the tread-chain at either or both ends of the tread frame; and, finally to eliminate all rotating action on the traction members, the axles, shafts, bearings, bushings, gears and sprockets being subject to rotating strains only, the traction strains falling only on the stationary axle and bearings.

Figure 1:
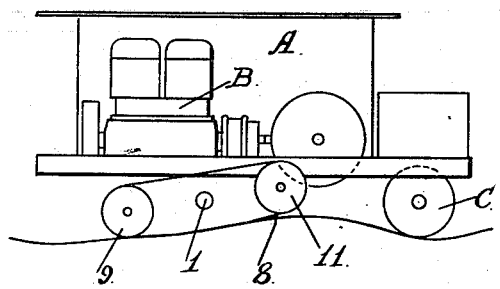
Figure 2:
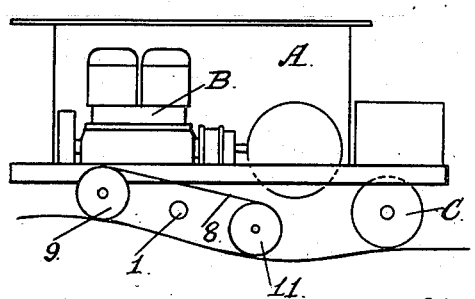
Figure 3:
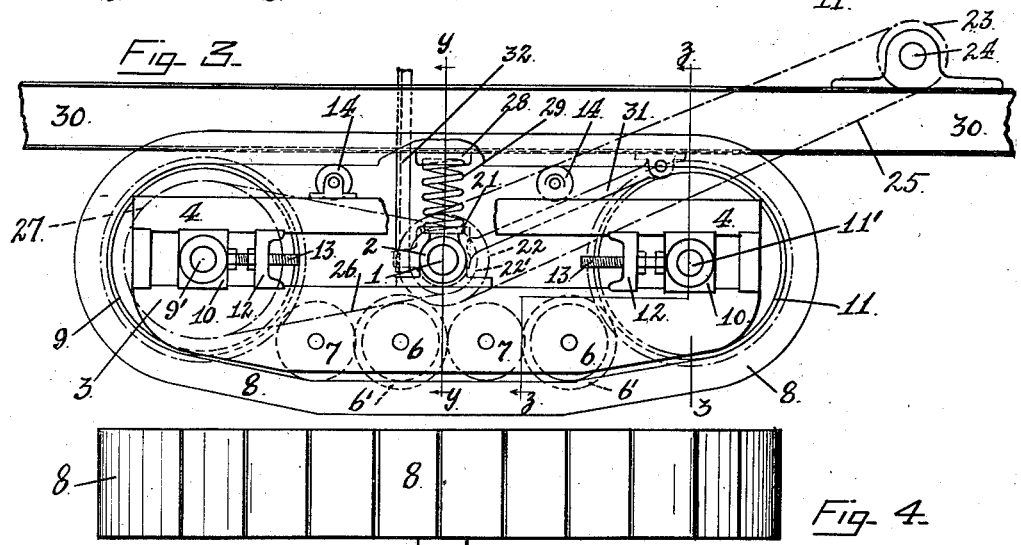
Figure 4:
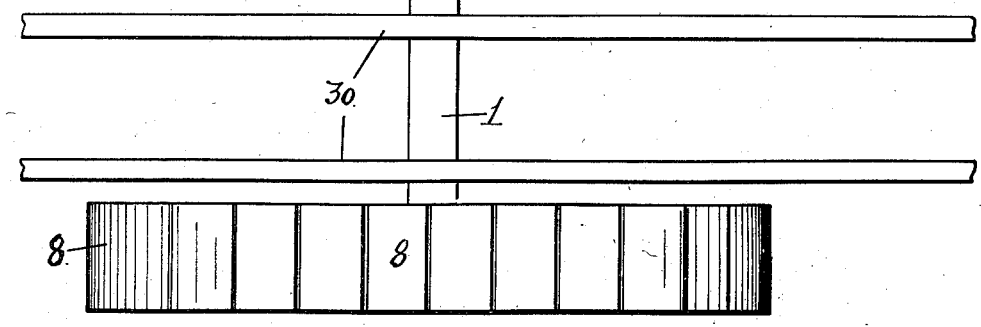

Referring to the accompanying drawings—Figure 1 is a diagrammatic elevation showing a traction engine fitted with my oscillating self-laying track, which conforms itself to an undulation of the ground. Fig. 2 is a similar view illustrating another situation requiring oscillation of the track to conform thereto. Fig. 3 is a side view, more or less diagrammatic, showing the general arrangement of my oscillating track as applied to the tractor. Fig. 4 is a skeleton plan view illustrating a track on each side of the vehicle. Fig. 5 is a horizontal sectional view taken on the line $x$—$x$ of Fig. 6, showing one side of the tractor, the track itself being omitted. Fig. 6 is a side elevation, broken, of the track and its mounting. Fig. 7 is a sectional elevation, enlarged, on the line $y$—$y$ of Fig. 3. Fig. 8 is a sectional elevation, enlarged, on the line $z$—$z$ of Fig. 3. Fig. 9 is a detail top plan of the driving sprocket engaging the tread-chain.

1 is the stationary main axle.

2 is one of the main-axle bearings in the tread or track frame. There are, of course, two of these, one on each side, that is, one in each tread-frame, there being two such frames, one on each side of the tractor, each frame carrying a self-laying track, as is indicated in Fig. 4.

The tread-frame comprises a lower part composed of two members, preferably pieces of channel iron 3, as clearly shown in Figs. 7 and 8, and an upper part, also composed of two members, preferably I-beams 4. The upper and lower parts are rigidly bolted together, as shown at 5 in Fig. 6.

The main axle bearings 2 are carried by the lower members 3 of the tread frames about midway of their length; and these two bearings, one on each side, carry practically the entire weight of the tractor. They are so fitted that the tread-frames may independently vibrate or oscillate about the main-axle, permitting either or both tracks or tread chains of the tractor, at the same or at different times, to take different positions to conform to the undulations or unevenness of the ground, as, for example, the positions shown in Figs. 1 and 2.

In the lower portion 3 of the tread-frame, there are mounted a number of heavy carrier wheels 6 and 7. For illustration four are shown. These wheels roll upon the upper surface of the lower run of the link-belt or tread-chain 8 and they carry practically the entire weight of the tractor. Two of these wheels, namely those designated by 6, have a peripheral tongue 6', and the other two, 7, have a peripheral groove 7'. The arrangement is such, as indicated in Fig. 6, that the tongues and grooves engage, and thereby all the wheels may be brought closer together.

Another advantage is that the tongues 6' of the carrier wheels 6 project between the two sides 8' of the tread-chain 8, as indicated in Fig. 6, thus serving as guides in said chain and guarding against lateral displacement. Also the groove 7' of that carrier wheel 7 which is rearmost or nearest the driver sprocket 9, permits the teeth of said sprocket to bury themselves in said groove while both wheel and sprocket are rotating, thus enabling all centers to be brought closer together than otherwise would be possible.

Between the lower and upper portions 3 and 4 of the tread-frames, at each end are fitted bearings 10, the forward ones carrying the shaft 11', of the front or idler sprocket 11 for the tread-chain 8, and the rear bearings carrying the shaft 9' for the driver sprocket 9.

The bearings 10, both the front and the rear bearings, are slidable and are adjustable by means of distance blocks 12 and screws 13. This construction provides for adjusting the tension of the tread or track-chain for change of centers between the main-axle and the sprocket shafts, and also provides for releasing the tension sufficiently to permit the mounting or demounting of the chain around the sprockets, and to adjust the horizontal center of said chain in relation to the axle in order to obtain the proper swinging and traction balance in the tread and tread frames.

The upper part 4 of the tread frames support one or more idler pulleys 14; I have here shown three of these in Fig. 6; they are for the purpose of carrying the slack in the upper run of the tread chain.

The tread-frame, pivotally connected with the main-axle 1, by the main bearing 2, is further connected with and braced from the axle, by means of two braces 15, as shown in Fig. 5, usually made of angle-iron. These extend from the lower members 3 of the tread-frame, to a collar 16 rotatably mounted on the axle, and having projections or wings 17 to receive said braces, the connection being such that the whole tread will swing or oscillate about the center.

It is well, in some cases, to brace the inner end of the driver-sprocket shaft 9', by the means shown in Fig. 5, comprising the bearing 18, collars 19 and turn-buckle strut 20, connected with the axle collar 16.

Upon the main axle 1 is the lower spring socket 21 of the tractor frame. Between this and the main bearing 2 is a double sprocket 22 and 22' free to rotate on the axle. Motion is transmitted from a suitable source, say, from a sprocket 23 on a shaft 24 in Fig. 3, by means of a chain 25 to the sprocket 22. Thence the motion is applied from the sprocket 22' by means of a chain 26 to a sprocket 27 fast on the shaft 9' of the driver-sprocket 9.

In Figs. 3 and 7—28 is the upper spring socket and 29 is the spring of the tractor-frame 30. In Fig. 3—31 is the link which pivotally connects the frame and axle, and 32 is a guide for controlling the relative movement of the two. In Fig. 5—33 is a draft link mounted on the axle. In Figs. 1 and 2—A indicates the tractor, having a front wheel C and a power plant B.

I claim:—

1. In a traction engine having a power-plant, the combination of a main axle; independent tread-frames, one on each side of the machine, each of said tread-frames being composed of a lower part and an upper part rigidly connected thereto; a bearing carried by the lower part of each tread-frame, said bearings being journaled on the main axle, one near each end thereof, adapting said tread-frames to independently oscillate about said axle; a sprocket carried at each end of each tread-frame; an endless tread-carrying chain carried by the sprockets of each tread-frame; a series of peripherally tongued and grooved carrying wheels journaled in the lower part of each tread-frame and rolling on the tread-chain; and means for transmitting motion from the power-plant of the traction engine to the tread-chains.

2. In a traction engine having a power-plant, the combination of a main axle; independent tread-frames, one on each side of the machine, each of said tread-frames being composed of a lower part and an upper part rigidly connected thereto; a bearing carried by the lower part of each tread-frame, said bearings being journaled on the main axle, one near each end thereof, adapting said tread-frames to independently oscillate about said axle; braces secured to each tread-frame, one forward of and another rearward of the axis of oscillation; collars journaled on the main axle, one collar being fixed to the inner ends of the braces of each tread-frame; an idler-sprocket carried at the forward end of each tread-frame; a driving-sprocket carried upon a journaled shaft at the rearward end of each tread-frame; means applied to each sprocket for varying its distance from the axis of oscillation of the tread-frames; a bearing on the inner end of each of said driving-sprocket shafts; longitudinally adjustable struts from said bearings to the said collars on the main axle; an endless tread-carrying chain carried by the sprockets of each tread-frame; carrying wheels journaled in the lower part of each tread frame and rolling on the tread-chains;

and means for transmitting motion from the power-plant of the traction engine to the driving sprockets.

3. In a traction-engine having a power-plant, the combination of a main-axle; independent tread-frames pivotally mounted upon and adapted to oscillate about said axle, one near each end thereof; a sprocket carried in each end of each tread-frame; an endless tread-carrying chain carried by the sprockets of each tread-frame; means applied to the sprockets for varying their distance from the axis of oscillation of the tread-frames; a series of peripherally tongued and grooved carrying and guiding wheels mounted in the tread-frames and rolling on the upper surface of the lower run of the tread-chains; power transmitting devices in the axis of oscillation of the tread-frames; means for transmitting motion from the power-plant of the traction engine to said devices; and means for transmitting motion from said devices to one of the sprockets of each tread-chain to drive said chains.

4. In a traction-engine having a power-plant, the combination of a main axle; independent tread-frames, one on each side of the machine, each of said tread-frames being composed of a lower part and an upper part, the two rigidly connected; a bearing carried by the lower part of each tread-frame, said bearings being journaled on the main-axle, one near each end thereof, adapting said tread-frames to independently oscillate about said axle; a sprocket carried at each end of each tread-frame; an endless tread-carrying chain carried by the sprockets of each tread-frame; carrying wheels mounted in the lower part of each tread-frame and rolling on the upper surface of the lower run of the tread-chain; idler pulleys carried by the upper part of the tread-frames to support the upper run of the tread-chains; power transmitting devices in the axis of oscillation of the tread-frames; means for transmitting motion from the power-plant of the traction engine to said devices; and means for transmitting motion from said devices to one of the sprockets of each tread-chain to drive said chains.

5. In a traction-engine having a power-plant, the combination of a main axle; independent tread-frames, one on each side of the machine, each of said tread-frames being composed of a lower part and an upper part, the two rigidly connected; a bearing carried by the lower part of each tread-frame, said bearings being journaled on the main-axle, one near each end thereof, adapting said tread-frames to independently oscillate about said axle; a sprocket carried at each end of each tread-frame; means applied to the sprockets for varying their distance from the axis of oscillation of the tread-frames; an endless tread-carrying chain carried by the sprockets of each tread-frame; carrying wheels mounted in the lower part of each tread-frame and rolling on the upper surface of the lower run of the tread-chain; idler pulleys carried by the upper part of the tread-frames to support the upper run of the tread-chains; power transmitting devices in the axis of oscillation of the tread-frames; means for transmitting motion from the power-plant of the traction engine to said devices; and means for transmitting motion from said devices to one of the sprockets of each tread-chain to drive said chains.

6. In a traction-engine having a power-plant, the combination of a weight-carrying axle; independent tread-frames pivotally mounted upon and adapted to oscillate about said axle, one near each end thereof; braces secured to each tread-frame, one forward of and another rearward of the axis of oscillation; a collar journaled on the main-axle, said collar being connected with the inner ends of the braces; a sprocket carried in each end of each tread-frame; an endless tread-carrying chain carried by the sprockets of each tread-frame; carrying wheels mounted in the tread-frames and rolling on the upper surface of the lower run of the tread-chains; power transmitting devices in the axis of oscillation of the tread-frames; means for transmitting motion from the power-plant of the traction engine to said devices; and means for transmitting motion from said devices to one of the sprockets of each tread-chain to drive said chains.

7. In a traction-engine having a power-plant, the combination of a main-axle; independent tread-frames pivotally mounted upon and adapted to oscillate about said axle, one near each end thereof; braces secured to each tread-frame, one forward of and another rearward of the axis of oscillation; a collar journaled on the main-axle, said collar being connected with the inner ends of the braces; shafts carried in each end of each tread-frame; a sprocket on each shaft; means applied to each shaft for varying the distance of its sprocket from the axis of oscillation of the tread-frames; a bearing on each of the rear sprocket-shafts; a turn-buckle strut from said bearings to the collar on the main axle; an endless tread-carrying chain carried by the sprockets of each tread frame; carrying wheels mounted in the tread frames and rolling on the upper surface of the lower run of the tread-chains; power transmitting devices in the axis of oscillation of the tread-frames; means for transmitting motion from the power-plant of the traction-engine to said devices; and means for transmitting motion from said devices to the rear sprocket-shafts.

8. In a traction-engine having a power-plant, the combination of a main-axle; independent tread-frames pivotally mounted upon and adapted to oscillate about said axle, one near each end thereof; a sprocket carried in each end of each tread-frame; an endless tread-carrying chain carried by the sprockets of each tread-frame; a series of peripherally tongued and grooved carrying wheels mounted in the tread frames and rolling on the tread-chains; power transmitting devices in the axis of oscillation of the tread-frames; means for transmitting motion from the power-plant of the traction engine to said devices; and means for transmitting motion from said devices to one of the sprockets of each tread-chain to drive said chains.

In testimony whereof I have signed my name to this specification in the presence of two subscribing witnesses.

GOMER W. PRICE.

Witnesses:
WM. F. BOOTH,
D. B. RICHARDS.